Aug. 16, 1932.   P. L. PRINS   1,871,734
MOTOR CAR FRAME
Filed Aug. 22, 1928   2 Sheets-Sheet 1

INVENTOR
Peter Lourens Prins by Herbert J. Barlow
Attorney

Aug. 16, 1932.  P. L. PRINS  1,871,734
MOTOR CAR FRAME
Filed Aug. 22, 1928   2 Sheets-Sheet 2

INVENTOR
Peter Lourens Prins
by *Herbert J. Barton*
Attorney

Patented Aug. 16, 1932

1,871,734

UNITED STATES PATENT OFFICE

PETER LOURENS PRINS, OF BUSSUM, NETHERLANDS, ASSIGNOR TO DANIEL MAURITS KAN, OF HILVERSUM, NETHERLANDS, FRANCISCUS ANTONIUS DRIEMAN, MARINUS LEONARD KAN, AND FRANS JOHAN JACOB VAN SCHAARDENBURG, ALL OF AMSTERDAM, NETHERLANDS

MOTOR CAR FRAME

Application filed August 22, 1928, Serial No. 301,325, and in the Netherlands September 5, 1927.

Heavy six-wheeled motor cars are sometimes provided with four driving wheels. The rear driving axle of such cars has some axial play in order that it need not follow all the lateral movements of the frame.

My present invention, which also relates to a motor car having two rear axles which take up the greater part of the load, has for its object to render the car more easily steerable and to reduce the wear and tear of the tires, driving mechanism, chassis, etc. With this object in view, I suggest to provide the car with a common frame supported by both driving rear axles and to make the rear driving axle self-adjustable, i. e. to provide for means permitting said axle to perform a universal movement about one or more points located forward of said axle, said movement being a combination of an axial motion with a rotation in a horizontal plane, without impairing the freedom of motion whereby the axle can follow the unevennesses of the road. Preferably I provide for a radius bar arrangement connected, for instance through a universal joint, with the frame, without directly engaging the front driving axle.

In order to prevent swaying when the car is driven at considerable speed and in order that the car may be more easily steered when running backwards, I further suggest to provide for one or a plurality of readjusting springs adapted to center said axle in the central vertical plane, without, however, preventing it from self-adjustment when running through a curve.

Figure 1:
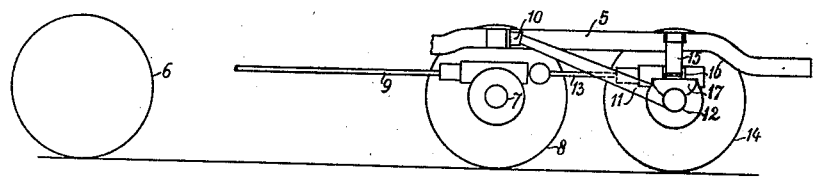
Figure 2:
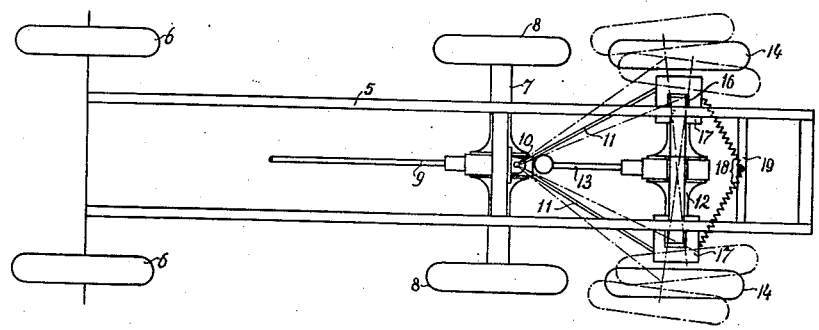

The drawings illustrates two embodiments of the invention,

Fig. 1 is a plan view,

Fig. 2 a side elevational view and

Figure 3:
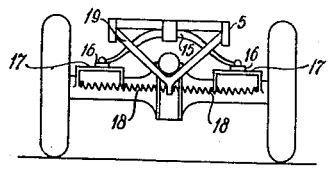

Fig. 3 a rear view of Fig. 2, of the first embodiment, whereas

Figure 4:
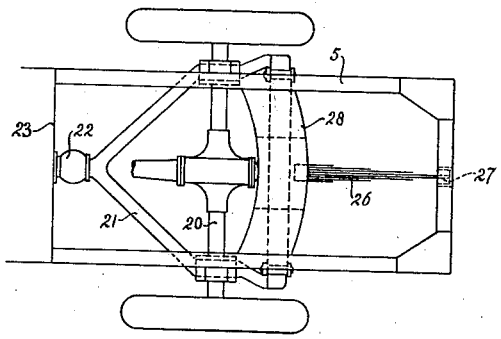
Figure 5:
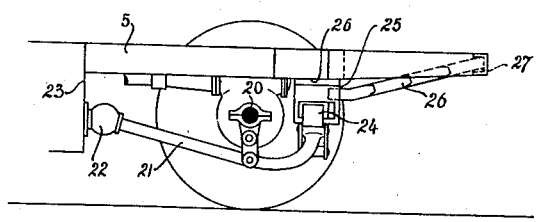
Figure 6:
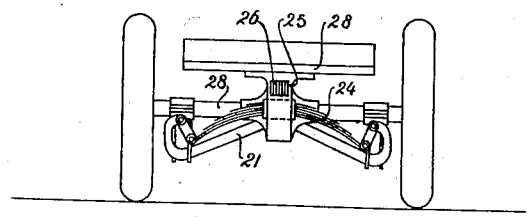

Figs. 4, 5 and 6 are corresponding views of the second embodiment.

The frame 5, the steering wheels 6, the driving axle 7 with the driving wheels 8, and the cardan shaft 9 of the motor car illustrated in Fig. 1 are the equivalents of known constructions. Secured to the frame as at 10 is a universal joint for a radius bar arrangement 11, which controls the rear driving axle 12. The cardan shaft 9 has an extension 13 for driving the rear driving wheels 14. The rear driving axle 12 carries a blade spring 15 provided with slide shoes 16 movable over guides 17 of the axle casing, the length and width of said guides being sufficient to allow the axle 12 to swing out in either direction through an angular distance of say 7°, as shown in dash and dot lines in Fig. 2.

The rear driving axle is re-adjusted in its central position by the differential action of the second axle and by two coiled springs 18 secured to a bracket 19 of the frame. I prefer to mount these springs with a certain amount of initial tension, so that they both remain under tension when the axle swings to either side.

In accordance with Figs. 4, 5 and 6, the rear driving axle 20 is associated with a bifurcated thill 21, which is connected with a bracket 23 of the frame through a ball joint 22. If necessary, said ball joint may be suitably sprung. Both ends of the fork 21 are formed as spring hangers for a transverse spring 24. The spring buckle 25 is formed as a sliding block and supports the guide 28 secured to the frame 5. The buckle 25 engages a blade spring 26, the thin end of which projects into a recess 27 of the frame. Said spring helps to re-adjust the rear driving axle 20 which, however, has freedom of swinging motion in a curve.

The radius bar arrangement could, of course, be replaced by a guide or other controlling means.

I claim:

A motor car chassis having a frame forward and rear driven axles, a radius bar connected to said rear driven axle, a universal joint connecting said radius bar to said frame, supporting resilient means connected to said frame and slidably engaging said rear driven axle and a non-supporting resilient means between said frame and said axle normally maintaining said rear driven axle in normal axial position.

In testimony whereof I affix my signature.

PETER LOURENS PRINS.